United States Patent
Schulein

(10) Patent No.: US 8,657,237 B2
(45) Date of Patent: Feb. 25, 2014

(54) FLYING OBJECT FOR TRANSONIC OR SUPERSONIC VELOCITIES

(75) Inventor: Erich Schulein, Scheden (DE)

(73) Assignee: Deutsches Zentrum fur Luft-und Raumfahrt E.V., Köln (DE)

(*) Notice: Subject to any disclaimer, the term of this patent is extended or adjusted under 35 U.S.C. 154(b) by 281 days.

(21) Appl. No.: 12/784,611

(22) Filed: May 21, 2010

(65) Prior Publication Data

US 2010/0243818 A1    Sep. 30, 2010

(51) Int. Cl.
*B64C 21/00*    (2006.01)

(52) U.S. Cl.
USPC .................. 244/204; 244/200.1; 244/130

(58) Field of Classification Search
USPC ...... 244/204, 34 A, 215, 200.1, 203.1, 159.3, 244/1 N, 45 R, 130
See application file for complete search history.

(56) References Cited

U.S. PATENT DOCUMENTS

| | | | |
|---|---|---|---|
| 3,643,901 A * | 2/1972 | Patapis | 244/130 |
| 3,655,147 A | 4/1972 | Preuss | |
| 3,712,566 A * | 1/1973 | Branen et al. | 244/117 A |
| 4,650,139 A * | 3/1987 | Taylor et al. | 244/172.4 |
| 5,139,716 A * | 8/1992 | Wrona et al. | 156/89.26 |
| 6,091,375 A * | 7/2000 | Goto et al. | 343/872 |
| 6,581,870 B1 * | 6/2003 | Runne et al. | 244/1 N |
| 7,278,609 B2 * | 10/2007 | Arata | 244/130 |
| 2006/0213179 A1 * | 9/2006 | Sanders et al. | 60/204 |
| 2007/0295856 A1 | 12/2007 | Schulein | |

FOREIGN PATENT DOCUMENTS

| | | |
|---|---|---|
| DE | 10305973 B3 | 5/2004 |
| DE | 102006003638 B4 | 1/2008 |
| DE | 102006015952 B4 | 1/2008 |
| DE | 102006061709 B3 | 5/2008 |
| EP | 1939578 B1 | 12/2007 |

OTHER PUBLICATIONS

Viren Menezes, et al., "Shock Tunnel Study of Spiked Aerodynamic Bodies Flying at Hypersonic Mach Numbers", Springer verlag, Oct. 1, 2002.

M. Rein, H. Rosemann, E. Schulein: "Wave Drag Reduction by Means of Aerospikes on Transonic Wings," In: Hannemann, K.; Seiler, F (Editors): 26th International Symposium on Shock Waves, CD-ROM Proceedings, ISSW 26, Gottingen (Germany), Jul. 2007.

H. Ogawa, H. Babinsky: "Evaluation of wave drag reduction by flow control," Aerospace Science and Technology 10 (2006) 1-8; Elsevier SAS, Sep. 2005.

(Continued)

*Primary Examiner* — Rob Swiatek
*Assistant Examiner* — Vicente Rodriguez
(74) *Attorney, Agent, or Firm* — Thomas | Horstemeyer, LLP

(57) ABSTRACT

A flying object which moves with a transonic or supersonic velocity is disclosed. The inventive flying object comprises a main body, a streaming element and a holding element. The holding element holds the streaming element distant from the main body. The streaming element is permeable for the airstream. For one embodiment the streaming element is built with a porous material. The streaming element has an outer surface with the shape of a cone or a truncated cone. The holding element holds the streaming element in an orientation with the cone opening towards the airstream.

15 Claims, 5 Drawing Sheets

(56) References Cited

OTHER PUBLICATIONS

W. S. Wong, N. Qin, N. Sellars, H. Holden, H. Babinsky: "A combined Experimental and Numerical Study of Flow Structures Over Three-Dimensional Shock Control Bumps;" Aerospace Science and Technology 12 (2008) 436-447; Elsevier Masson SAS, Oct. 2007.

B. Konig, M. Patzold, T. Lutz, E. Kramer, H. Rosemann, K. Richter, H. Uhlemann: "Numerical and Experimental Validation of Three-Dimensional Shock Control Bumps;" 4th Flow Control Conference, Jun. 23-26, 2008, Seattle, Washington, AIAA 2008-4001.

E. Stanewsky et. al.: Drag Reduction by Shock and Boundary Layer Control—Results of the Project EUROSHOCK II, Supported by the European Union 1996-1999, Springer Verlag, 2002, 12 Pages.

* cited by examiner

FLYING OBJECT FOR TRANSONIC OR SUPERSONIC VELOCITIES

FIELD OF THE INVENTION

The present invention generally relates to a flying object for transonic or supersonic velocities, wherein the interaction between the airstream and the flying object is improved or optimized.

BACKGROUND OF THE INVENTION

A reduction of the overall drag resistance or total air resistance of an airplane for transportation of goods and/or passengers is in the focus of modern aircraft aerodynamics. For reducing the resistance long lasting investigations have been directed to attempts to keep the airflow in the boundary layer laminar by suitable shapes of the relevant surfaces, also called natural laminar flow or LNF. Such natural laminar flow is provided by a pressure distribution leading to a steady acceleration of the airstream in the region of transonic or supersonic velocities. However, as a side effect, this pressure distribution used for providing natural laminar flow involves a recompression shock wave. The intensity of the recompression shock wave is drastically increased when compared with traditional profiles of flying objects or wings.

This disadvantage of an NLF-profile results both in an increased wave drag and in an increased hazard of separation of the boundary layer at the wing induced by shock waves. A reduction of the shock-wave intensity by influencing the airstream around the flying object is one possible way of avoiding the aforementioned drawbacks.

It is well known that the wave drag increases with an increasing intensity of the shock waves. Furthermore, it is well known that a reduction of the intensity of the shock wave for a given local Mach number of the airstream might be achieved by splitting the shock-wave into some weaker shock waves.

The background art discloses a plurality of different measures and devices for influencing the wave drag at transonic or supersonic wings. Most of the proposed devices are located at the outer surface or integrated into the outer surface of a wing with the aim of splitting the front of a shock wave into a plurality of shock or compression waves and to extend the region of increasing pressure in the airstream near the surfaces. The resulting flow with multiple shock waves has a reduced induced wave drag. One of these known passive measures is to shape a surface in the airstream with local bumps. The bumps cause a softer compression upstream the main shock wave due to the local wall geometry. Other measures integrate cavities or permeable inserts for the airstream into the surface for inducing a passive ventilation of the airstream and for causing a compression upstream of the main shock wave due to the induced secondary flow.

For other active measures a partial flow of the airstream is periodically or continuously sucked through channels of the outer surface of the flying object or air is blown out off these channels into the boundary layer of the airstream. Furthermore, it is well known to actively change the shape of the surface that is positioned in the airstream.

German Patent No. DE 103 05 973 B3 discloses the use of aero-spikes for reducing a wave drag in a transonic airstream, see FIGS. 1 to 3 of this patent. In a supersonic or transonic region bodies generating shock waves are located above a boundary layer near the surface of the flying objects. These bodies might cause an induced separation bubble for causing additional shock waves. The additional shock waves stepwise decelerate the airstream upstream of the main shock wave. The induced shock waves are suitable for influencing a comparatively large region of the airstream in case of the bodies being located with a distance from the surface of the flying object or wing. The increase of pressure in the airstream is not caused abrupt by one single strong shock wave but continuously which leads to a reduction of the overall wave drag.

German Patent No. DE 10 2006 061 709 B3, corresponding to European Patent No. EP 1 939 578 B1, discloses a porous aero-disc. The porous aero-disc is held by an aero-spike at a blunt nose of a supersonic or transonic flying object. The use of a porous aero-disc has been proven to be effective also for variable streaming conditions with improved characteristics when compared with traditional aero-spikes. The aero-disc is built with a material permeable for the airstream comprising a plurality of fine streaming channels for causing a thicker shear layer in a region downstream from the aero-disc.

The present skill for a reduction of a drag resistance and the use of aero-spikes for transonic or supersonic airstreams is summarized in the following articles:

[1] E. Stanewsky et. al.: Drag Reduction by Shock and Boundary Layer Control—Results of the Project EUROSHOCK II, Supported by the European Union 1996-1999, Springer Verlag, 2002
[2] M. Rein, H. Rosemann, E. Schülein: Wave drag reduction by means of aerospikes on transonic wings, In: Hannemann, K.; Seiler, F. (Editors): $26^{th}$ International Symposium on Shock Waves, CD-ROM Proceedings, ISSW 26, Göttingen (Germany), July 2007.
[3] H. Ogawa, H. Babinsky: Evaluation of wave drag reduction by flow control; Aerospace Science and Technology 10 (2006) 1-8; Elsevier SAS, September 2005.
[4] W. S. Wong, N. Qin, N. Sellars, H. Holden, H. Babinsky: A combined experimental and numerical study of flow structures over three-dimensional shock control bumps; Aerospace Science and Technology 12 (2008) 436-447; Elsevier Masson SAS, October 2007.
[5] B. König, M. Pätzold, T. Lutz, E. Kramer, H. Rosemann, K. Richter, H. Uhlemann: Numerical and Experimental Validation of Three-Dimensional Shock Control Bumps; 4th Flow Control Conference, 23-26 Jun. 2008, Seattle, Wash., AIAA 2008-4001.

OBJECT OF THE INVENTION

It is one object of the invention to provide a flying object with a streaming element having an increased efficiency for producing a slowed wake airstream resulting in a profile with reduced total pressure.

Another object of the present invention is to provide a flying object with a streaming element controlling the airstream also in larger distances from the streaming element.

Furthermore, it is an object of the present invention to provide a flying object with a streaming element being robust with respect to shock waves having different or moving locations.

Another object of the present invention is to provide a flying object with a streaming element suitable for reducing a wave drag.

Furthermore, an object of the invention is to provide a flying object with a streaming element with decreased heating effects.

SUMMARY OF THE INVENTION

The present invention bases on the following analysis of measures known from the prior art:

Known devices for drag reducing located within the surface (e.g. contour bumps or passive ventilation) do not lead to robust effects. Contour bumps exhibit a strong dependency of their effect on the shape and their position. Known attempts of using a passive ventilation have shown no or only a small positive overall effect. This is due to the fact that the own drag of the device used for the passive ventilation is relatively large.

Aero-spikes described e.g. in German Patent No. DE 103 05 973 B3 in tests performed in wind tunnels have only resulted in limited separation of the thin boundary layer when inducing the separation by shock waves at transonic wings. The reason is that the intensity of the shock waves is not sufficient at typical small Mach numbers, see [2]. The tests have also shown that the common configurations of aero-spikes only have a positive effect in case that the spike, working as a shock-wave generator or a displacement body, is located upstream of the main shock wave, see FIG. 2 of German Patent No. DE 103 05 973 B3. This principle is very similar to a 3-D contour bump with the difference that an aero-spike is positioned outside of a viscous boundary layer. The disadvantages of such aero-spikes working as a displacement body are very similar to the disadvantages of contour bumps. Accordingly, the aero-spikes have a significant own drag due to their cross-section and the comparatively large longitudinal extension both required for good efficiency.

A common disadvantage of known measures is that these measures are only effective at very short device-to-shock distances. These measures show a large sensitivity with respect to the chosen position relative to the shock-wave front. Attempts to prove a positive effect of an aero-spike used as a wake-generator for influencing the downstream flow in tests were not successful, see [2]. It is to be assumed that the reason for this is that the intensity of the shock waves is also here not sufficient for self-induced viscous wakes for small supersonic or transonic Mach numbers.

Preliminary tests have shown that the effect of a wake-generator might be slightly improved by using a porous aero-disc being permeable for the airstream, see German Patent No. DE 10 2006 061 709 B3. However, the effect also in this case is limited to relatively small device-to-shock distances.

The invention proposes using a permeable, in particular porous streaming element. The porous streaming element might be used for inducing a shock wave. Furthermore, the invention proposes using a holding element for determining a distance of the streaming element from the flying object and/or an orientation of the streaming element with respect to the airstream and the flying object. Holding elements that might be used for the present invention might be those described in German Patent Nos. DE 103 05 973 B3 and DE 10 2006 061 709 B3 or any other holding element of a known type.

According to the invention, the streaming element comprises a conical outer shape, wherein the whole outer surface of the streaming element might be conical or at least one axial region of the streaming element. The invention also covers embodiments where only a part of the outer surface extending less than 360° in circumferential direction is conical. It is also possible that the outer surface has the shape of a truncated cone.

According to the invention, the streaming element is held by the holding element in an orientation with the cone opening towards the airstream. With other words, the tip of the cone is located downstream of the airstream. The streaming element protrudes with its increasing diameter or its blunt end into the airstream. Such shape and orientation of the streaming element results in a compact wake-generator. The conical outer shape has in particular the effect that a subsonic low-momentum wake flow exits from the streaming element. In streaming direction the wake flow experiences a monotone increasing cross-section without a diminution in downstream direction. No significant acceleration of the subsonic airstream caused by the geometry should exist. A relatively slow airstream is withheld also for an increased distance from the streaming element. The shape and construction of the streaming element guarantees a large volumetric flow of decelerated air upstream of the shock wave for a self-induced shock-wave control. Furthermore, it has been shown that the device drag of a permeable aero-cone is smaller than that of an impermeable aero-disc having the same diameter in the cross-section. In summary, the inventive shape and orientation of the streaming element results in a reduction of the drag and/or a reduction of heating effects.

The inventive aero-cone might be a solid body with a filled cross-section such that in the direction of the airstream the length of the material of the aero-cone decreases with an increasing distance from the symmetry axis of the aero-cone. As a consequence, streaming channels with an orientation parallel to the streaming direction, built within the aero-cone and ending at the outer surface of the cone become shorter with an increasing distance from the symmetry axis.

According to another embodiment of the invention, the aero-cone is hollow or comprises a conical recess. In particular, the hollow aero-cone is open versus the airstream such that the aero-cone builds a closed "funnel" without an exit.

It is possible that the aero-cone is a solid or hollow body comprising recesses, bores and the like for building streaming channels. Furthermore, it is possible that the aero-cone is built with layers or partial regions of porous materials comprising different porosities, e.g. in inner regions and outer regions.

According to one embodiment, the porosity in the inner region of the aero-cone is larger than the porosity in the outer region or an exterior shell of the aero-cone such that the exterior shell is more closed for the airstream.

For another embodiment, the aero-cone is a hollow body having a constant wall thickness.

The streaming element might be built with a porous material wherein the pores of the streaming element build streaming channels for partial airflows. These streaming channels might have an orientation coaxial to the airflow, transverse to the airflow or any orientation. The aerodynamic behavior of the streaming element depends on the choice of the porous material, the manufacturing process, the resulting sizes of the pores as well as the density of the pores. These properties determine the part of the airstream being guided through the streaming element and the remaining part streaming around the streaming element. Furthermore, these properties determine the streaming characteristics of the part of the airstream floating through the streaming element. By building streaming channels by means of open pores a kind of restricting or retarding effect might be generated independent on the size of the pores at the entrance of the airstream into the streaming channels. On the other hand, the pores determine the conditions at the exit of the airstream from the streaming channels at the outer surface of the streaming element.

It is possible to configure the geometry of the pores and the streaming channels built by the pores, the density of the pores, the size distribution of the pores by the choice of the used material and the manufacturing process, in particular by choice of the particle size of the porous material prior to forming the streaming element, by choosing the pressure when compressing the aforementioned particles, by using suitable additional particles, by using and dosage of a pore builder or blowing agent, by the choice of the temperature during the manufacturing process or other manufacturing parameters and/or by manufacturing separate additional streaming channels or bores.

It might be also of advantage to manufacture pores with differing streaming cross-sections, e.g. a stochastic distribution of the sizes of the pores. Such a stochastic distribution leads to differing streaming channels and airstreams at the exit from the streaming channels with differing exit velocities for partial airstreams that might have an improved interaction with the airstream streaming around the streaming element.

For some embodiments, the cross-sections of the openings of the streaming channels in the outer surface of the streaming element should cover a large percentage of the overall outer surface for a good interaction between the airstream guided through the streaming channels and the airstream streaming around the streaming element and/or for large volumetric flows through the streaming channels. When using recesses or bores for building the streaming channels, these recesses or bores lead to a reduction of the mechanical stiffness of the streaming element. Instead, in case of using only or also streaming channels built by pores of a porous material, the percentage of cross-sections for streaming channels and closed parts of the cross-sections might be increased up to a relation of 1:1 with at the same time high mechanical stiffness.

The term "porous" in the present application might be construed as "porous" in the common technical sense. However, also a broader construction of this term is covered by the present patent application. This covers any material region, wherein in an overall volume at least one hollow volume is built. The hollow volume might be built by discrete channels, bores or recesses.

The aero-cone, in particular a hollow aero-cone with constant wall thickness, might be built with sieves or filters made of a metal wire web, plastic webs, stamped or punched metal sheets, web-sinter-plates and the like. In particular, for applications at transonic wings without large thermal demands the aforementioned web structures might be advantageous with respect to porous materials as sinter metal or ceramics. In this case, the "size of the pores" is to be construed as a "width of the web" or a "bore diameter" or the other dimensions of the built channels.

Any porous material might be used. According to one embodiment of the invention, the porous material for building at least partial regions of the streaming element might be a sinter material or sinter metal. In a sinter process the sinter material is preformed. The preformed material is then subjected to heat below a melting temperature of the material with additional compression and hardening process. The process might involve pressing powder material, shaping and/or drying. The sinter process might also be a powder-metallurgy or the use of sintered plastic materials.

Furthermore, it is possible to use ceramic materials having a good wear resistance, high hardness or shore values, a high compressive strength, a high resistance at high temperatures, a high thermal conductivity and/or a good electrical insulation.

The aero-cone might be rotationally symmetric to the longitudinal axis, wherein the outer contour in a longitudinal semi-section might be straight, curved, ellipsoidal, parabolic, sinusoidal or has the shape of a segment of a circle.

The aero-cone might be positioned at any position in front of or besides the main body of the supersonic flying object, where it is held by the holding element. According to one embodiment of the invention, the holding element is built by a rod-like solid or hollow aero-spike holding the streaming element in front of a nose of the main body. Designs of aero-spikes and their connection with a main body of the flying object as well as additional components as disclosed by the applicant in German Patent Nos. DE 10 2006 061 709 B3, DE 10 2006 003 638 B4, corresponding to US Patent Application No. US 2007/0295856 A1, and/or German Patent No. DE 10 2006 015 952 B4 might be integrated into the present invention, in particular the use of an aero-spike with a passive guiding device for aligning the aero-spike with the airstream, the aero-spike having a pivoting degree of freedom with respect to the main body of the flying object, the use of an aero-spike having a longitudinal recess with radial openings built by bores or a porous material, the use of an aero-spike having a rotational degree of freedom with respect to a longitudinal axis of the main body of the flying object, means for actively or passively causing the rotation of the aero-spike, the use of a component for sensing information or a dome, an active or passive pivoting movement of the aero-spike and streaming element transverse to a longitudinal axis of the flying object according to German Patent No. DE 10 2006 003 638 B4, e.g. with the use of passive aligning elements.

Further details might be taken from the mentioned German patents.

According to another embodiment of the invention, the holding element comprises at least one degree of freedom with respect to the main body of the flying object. This degree of freedom might be used for changing the distance, the position and/or the orientation of the streaming element from, at or with respect to the main body. The aforementioned changes might be caused by the user prior to the flight or might be actively or passively caused during the mission of the flying object.

According to one embodiment of the present invention, the streaming element is passively aligned with the airstream. This might be done by guiding surfaces being located in the airstream and being responsible for an automated alignment with the airstream (the concept might be compared to that of a vane).

However, it is also possible that an active aggregate is provided for changing the distance, the position and/or the orientation of the streaming element with respect to the main body. The aggregate might comprise an electronic control unit which under consideration of operational states of the flying object, streaming conditions, the actual flight phase and the like, controls suitable actuators for causing the aforementioned changes.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
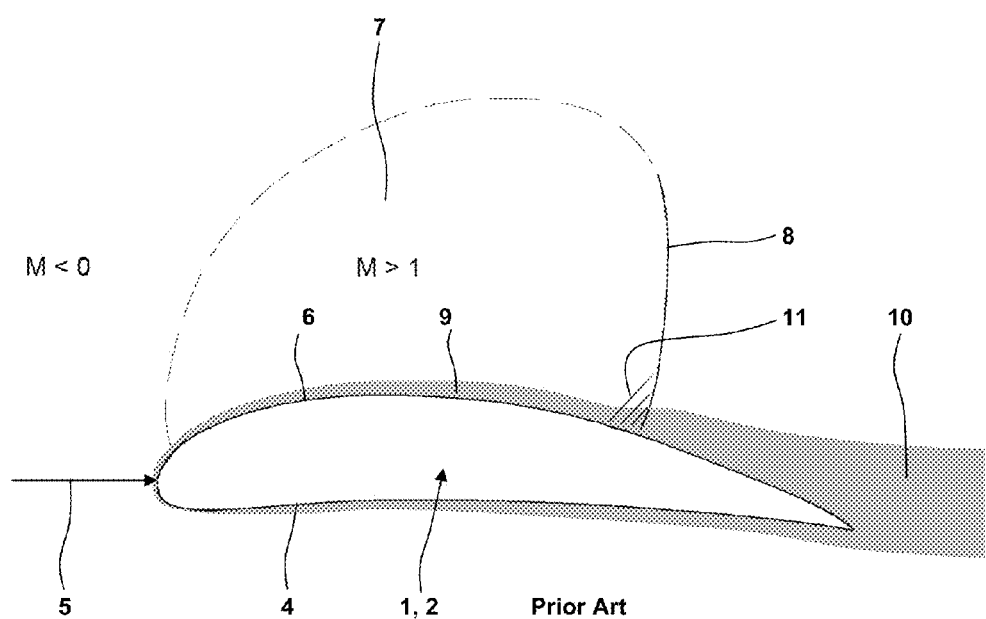
FIG. 1 schematically shows a transonic flying object being built with a wing according to the background art and without any streaming element.

Referring now in greater detail to the drawings, FIG. 1 shows a main body 1 of a flying object. In FIG. 1 the main body 1 is a wing 2. The wing 2 comprises an upper surface 6 and a lower surface 4. In an airstream 5 with large subsonic velocity due to the shape of the wing 2 the upper surface 6 might comprise a supersonic or transonic region 7. The region 7 ends in downstream direction with a shock wave 8. The shock wave 8 is characterized both by an abrupt increase of pressure as well as an increase of the entropy of the streaming fluid as well as a decrease of the total pressure of the streaming fluid. The shock wave 8 leads to the so called "wave drag". The interaction of the shock wave 8 with the boundary layer 9 located at the upper surface 6 of the wing 2 leads to a separation of the boundary layer which is indicated by a wake region 10 downstream of the shock wave 8 with additional losses. The separation of the boundary layer induces weaker shock waves 11 into the airstream. However, the weaker shock waves 11 interact only with an unimportant part of the stream passing the region 7. Furthermore, oscillations of the streaming conditions (also called "buffeting") might occur.

Figure 2:
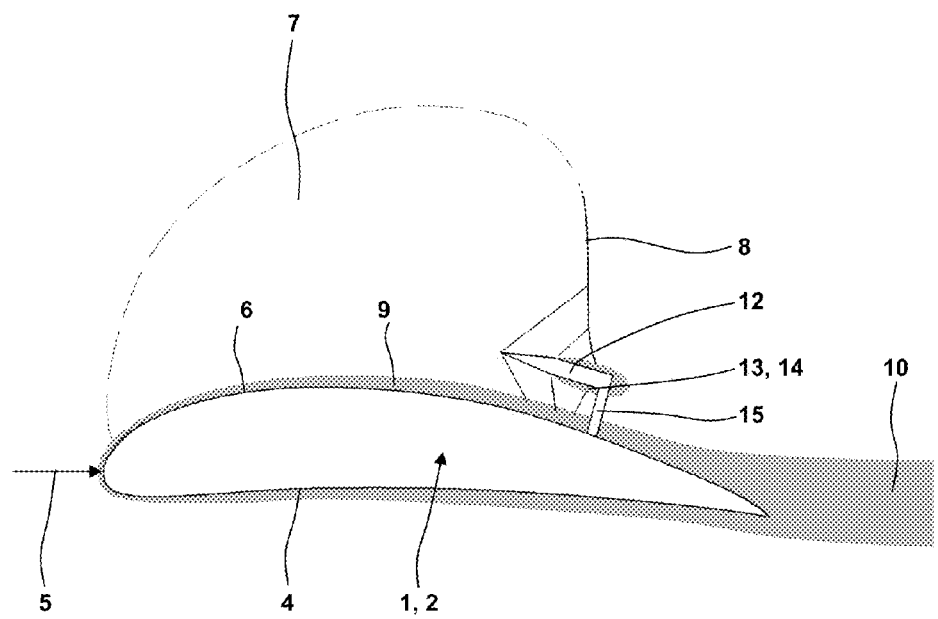
FIG. 2 schematically shows a transonic flying object being built with a wing and comprising a streaming element known from German Patent No. DE 103 05 973 B3.

FIG. 2 shows an arrangement with a streaming element 12 located in region 7 upstream from the shock wave 8. The streaming element 12 which might be a "spike" having an orientation transverse to the airstream 5 and extending over the upper surface 6, induces a separating bubble 13. The separating bubble 13 induces weaker shock waves 14 leading to a deceleration of the airstream in front of the shock wave 8 with an effect for a relevant part of the shock wave. Accordingly, the pressure increase is decreased by the streaming element 12. The loss of total pressure, the increase of entropy and the wave drag are decreased. The negative influence of the shock wave 8 upon the boundary layer 9 is also reduced. At the same time there are no direct negative effects of the streaming element 12 upon the boundary layer 9 so that a separation might completely be avoided. The weak shock waves 14 are induced with a distance and above the boundary layer 9 and not by a separation of the boundary layer as shown in FIG. 1. The streaming element 12 is held by a holding element 15 at the upper surface 3. The holding element 15 for the streaming element 12 is located outside from region 7 at the upper surface 6, here behind the shock wave 8. The streaming element 12 protrudes through the shock wave 8 into the region 7. The shock waves 14 of the streaming element 12 might be induced directly or indirectly by the separating bubble 13 starting from the streaming element 12. The shock waves 14 decelerate the airstream in front of the main shock wave 8.

Figure 3:
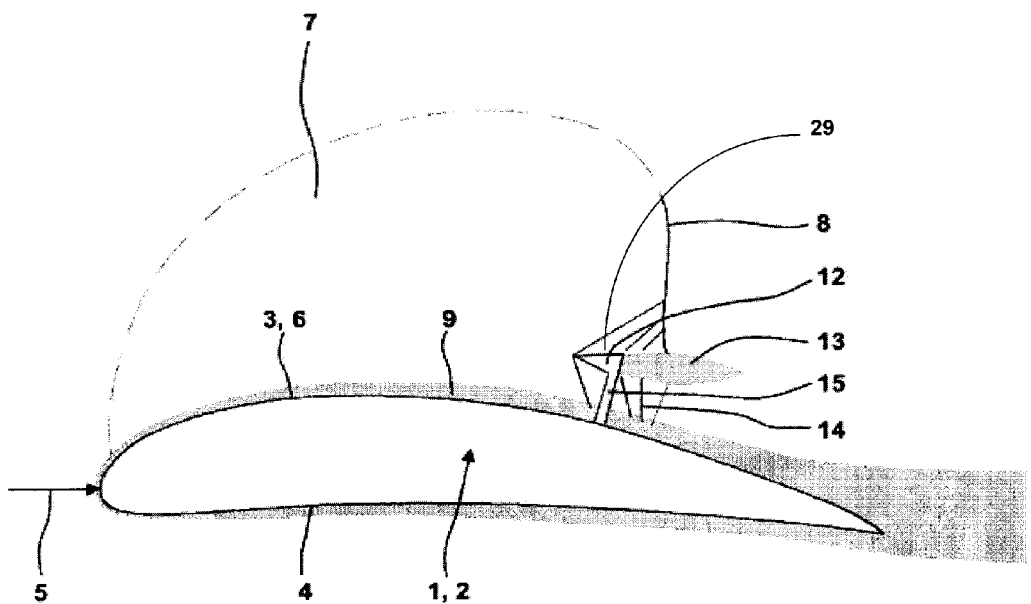
FIG. 3 schematically shows a transonic flying object being built with a wing and comprising a streaming element disclosed in German Patent No. DE 103 05 973 B3.

FIG. 3 shows an embodiment, wherein the streaming element 12 is held by the holding element 15 above and distant from the upper surface 6 of the wing 2. The holding element 15 is positioned within the region 7 of the upper surface 6 and protrudes from the upper surface 6. This position of the holding element 15 might to some degree influence the boundary layer 9 at the upper surface 6. Primarily also for this embodiment the streaming element 12 or the caused separating bubble 13 induces weak shock waves 14 that decelerate the airstream upstream of the strong shock wave 8 for reducing the losses involved with the shock wave 8. The embodiments shown in FIGS. 2 and 3 correlate for solid and completely filled cross-section of the streaming element 12 with the embodiments disclosed in German Patent No. DE 103 05 973 B3.

The modification of the invention is that the streaming element 12 shown in FIGS. 2 and 3 is porous and has an at least partially conical outer surface 29 with an opening of the cone towards the incoming airstream 5.

Figure 4:
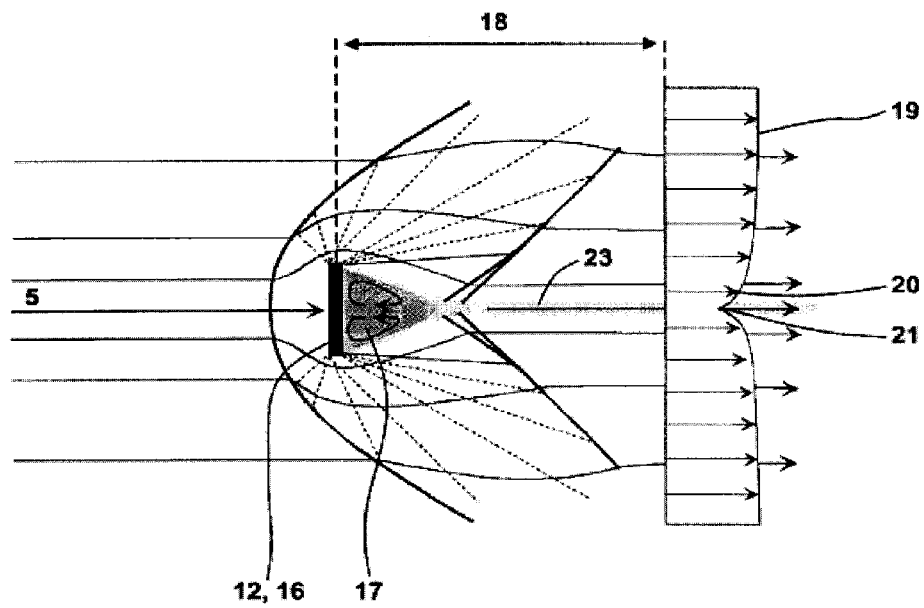
FIG. 4 schematically shows a transonic aero-spike with a solid aero-disc according to the background art.

FIG. 4 shows the airstream around a streaming element 12 with a design differing from the present invention, here a solid aero-disc 16. It is possible that the aero-disc 16 is held by an aero-spike located at the nose of the main body of the flying object. Behind the aero-disc 16 a separating bubble 17 is built. Within the separating bubble 17 there is a pressure which is usually smaller than p∞. Downstream of the separating bubble 17 there is a region (in particular a region surrounding the aero-spike) wherein the pressure approximates p∞. Finally in the region of the nose or front surface of the main body of the flying object there is another separation bubble, see German Patent No. DE 10 2006 061 709 B3.

FIG. 4 also shows the resulting total pressure profile 19 in a distance 18 in downstream direction from the streaming element 12 having the shape of an aero-disc 16. The total pressure profile 19 is symmetrically to the longitudinal axis of the aero-disc 16 with a decrease versus the longitudinal axis leading to a constriction 20. The constriction 20 is limited to a small region transverse to the streaming direction 5 so that the constriction builds a sharp V.

Figure 5:
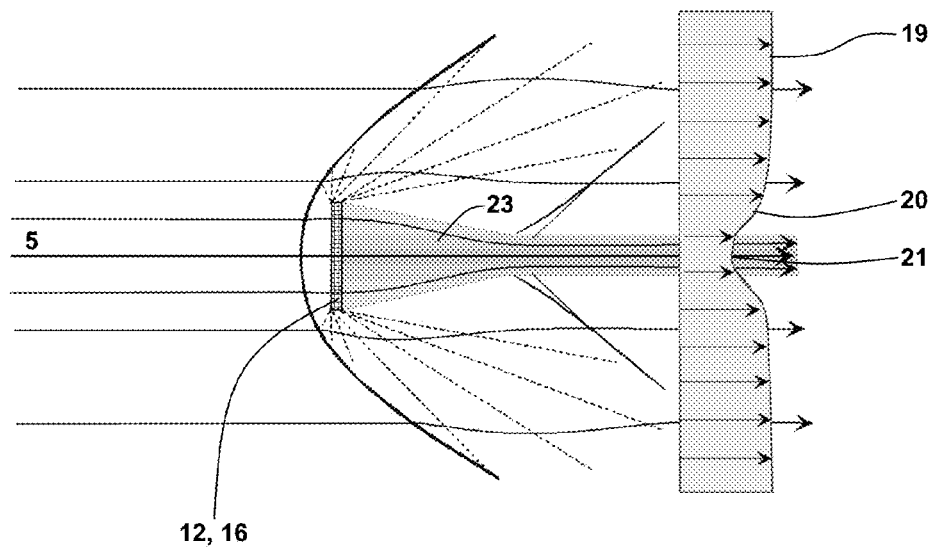
FIG. 5 schematically shows a transonic aero-spike holding a porous aero-disc as disclosed in German Patent No. DE 10 2006 061 709 B3.

FIG. 5 shows the total pressure profile 19 for the aero-disc 16 not being solid but porous as suggested in German Patent No. DE 10 2006 061 709 B3. The total pressure profile 19 shows an increased effect so that the constriction 20 has a larger extension transverse to the streaming direction 5 with a turning point of the constriction 20 and a constant part of the profile in the region of the longitudinal axis and a reduced minimum 21.

Figure 6:
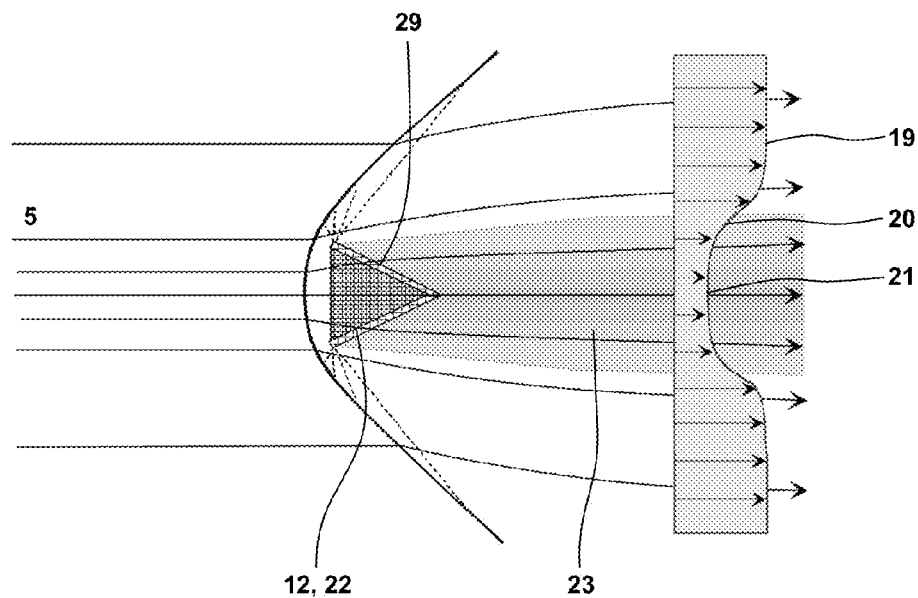
FIG. 6 schematically shows the airstream at a streaming element used in the inventive flying object, wherein the streaming element is built by a porous material and comprises a conical outer shape being permeable for the airstream.

FIG. 6 shows a corresponding total pressure profile 19 for the inventive streaming element 12 built by an aero-cone 22 with porous material. The constriction 20 has an extension transverse to the streaming direction 5 which is significantly increased with respect to FIGS. 4 and 5. The minimum 21 is shifted to a smaller value. A large region transverse to the streaming direction 5 with a constant small level or a level with only small changes of the pressure is built.

Figure 7:
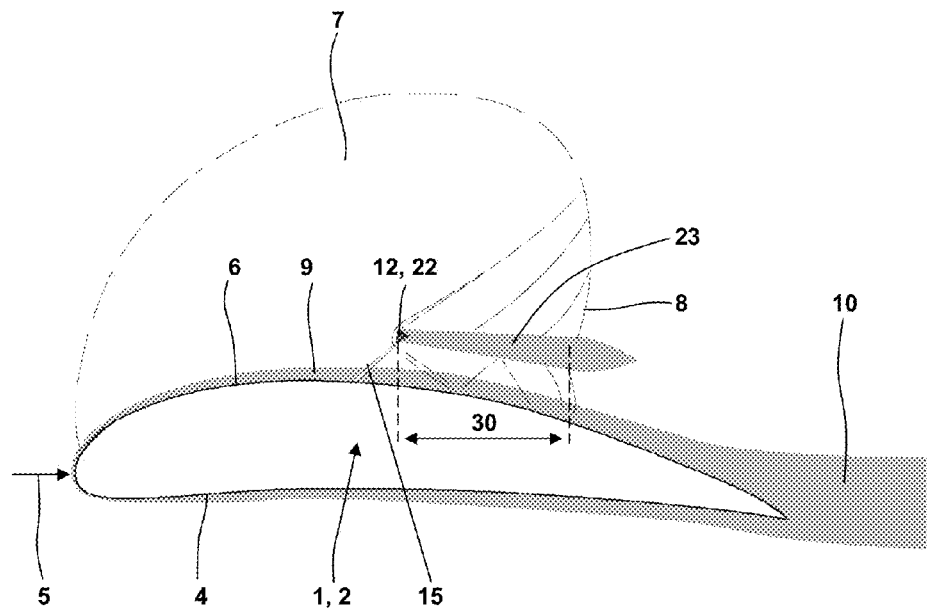
FIG. 7 schematically shows an inventive flying object comprising a streaming element according to FIG. 6 and a holding element.
Figure 8:
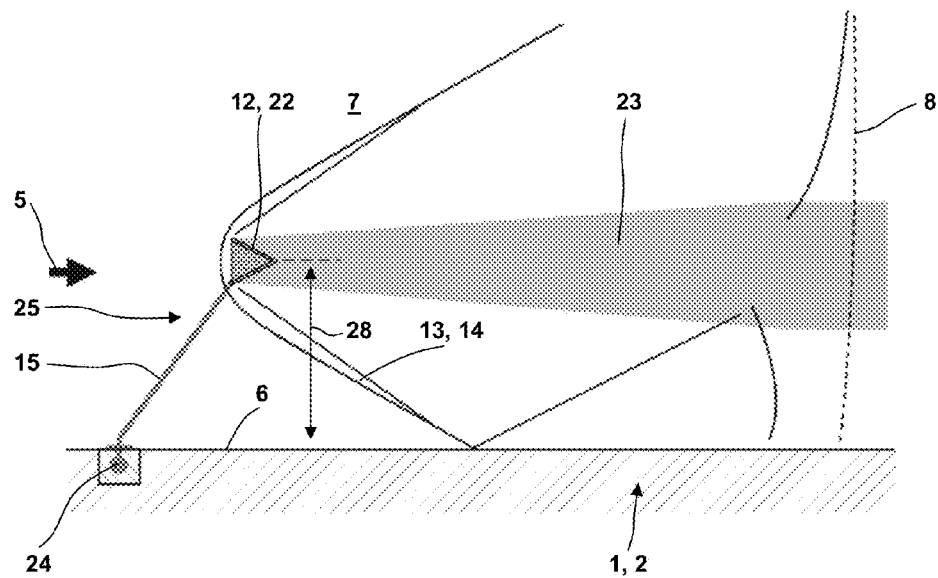
FIG. 8 shows a detail of the airstream at the flying object according to FIG. 7.

FIG. 7 shows the use of the inventive streaming element 12 built by an aero-cone 22 for a wing 2. In FIG. 8 a detail of FIG. 7 is shown in an increased scale. The aero-cone 22 might be positioned with a distance 30 from the location of the shock wave 8 which is larger than the corresponding distance of a differing streaming element as known from prior art. The aero-cone 22 is located and orientated with the tip or the reducing cross-section at the side facing away from the streaming direction 5 so that the opening of the cone is directed towards the streaming direction 5. The aero-cone 22 is mounted at the upper surface 6 of wing 2 by a holding element 15, here a slanted rod.

Whereas an induced wake region 23 for the embodiments shown in FIGS. 4 and 5 decreases in downstream direction, according to the inventive embodiment shown in FIG. 6 the induced wake region 23 does not decrease in downstream direction. In an optimal configuration it is possible that the induced wake region 23 increases in downstream direction.

In FIG. 8 the shock wave 8 which would be caused without the use of the inventive aero-cone 22 is indicated by the dashed line.

The holding element 15 might be fixedly linked with the upper surface 6. In the present case, the holding element 15 is coupled with a pivot 24 with the upper surface 6 of wing 2. For the shown embodiment, the pivot 24 comprises a pivoting degree of freedom with a pivoting axis having an orientation perpendicular to the upper surface 6. Due to the fact that the holding element 15 in the operating state shown in FIG. 8 has not an orientation perpendicular to the upper surface 6 but being slanted with an acute angle with respect to a vertical axis the holding element 15 and the streaming element 12 with the shape of an aero-cone 22 are self-aligning similar to a vane. The holding element 15 might have additional degrees of freedom or might be linked with the wing 2 with additional degrees of freedom. Furthermore, it is possible that the holding element 15 has a certain elasticity such that independent on the airstream a corresponding deformation of the holding element 15 is caused correlating with a distance 28 of the streaming element 12 from the upper surface 6. It is also possible to use actively or passively controlled holding devices, wherein the control is used for a variation or automatic adjustment of the distance of the streaming element 12 from the upper surface 6. It is also possible that the streaming element 12 with holding element 5 is completely telescoped or folded and integrated into the upper surface 6 of wing 2. For these embodiments, it is possible to extend the holding element 15 and the aero-cone 22 only from the upper surface 6 when necessary, whereas in other situations the holding element 15 and streaming element 12 do not influence the airstream around wing 2.

Figure 9:
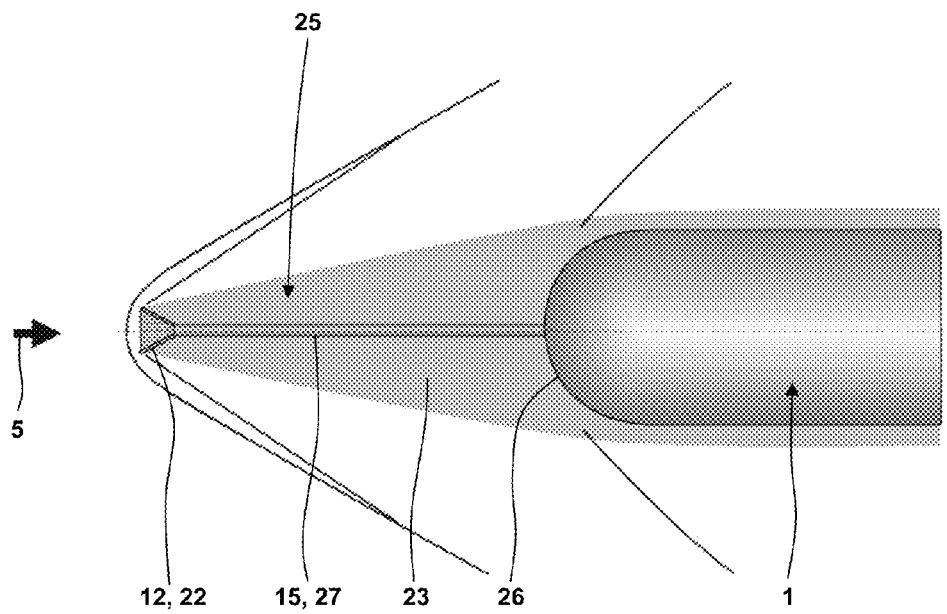
FIGS. 9 and 10 show the use of a conical streaming element at the upstream end of an aero-spike held by the nose of the main body of the flying object.

FIG. 9 shows the use of an aero-cone 22 building the streaming element 12 in connection with a nose 26 of a transonic, supersonic or hypersonic main body 1 which is in FIG. 9 a blunt main body. In this case, an aero-spike 27 is used, wherein the aero-spike 27 is built with the rod-like holding element 15 and the aero-cone 22.

Figure 10:
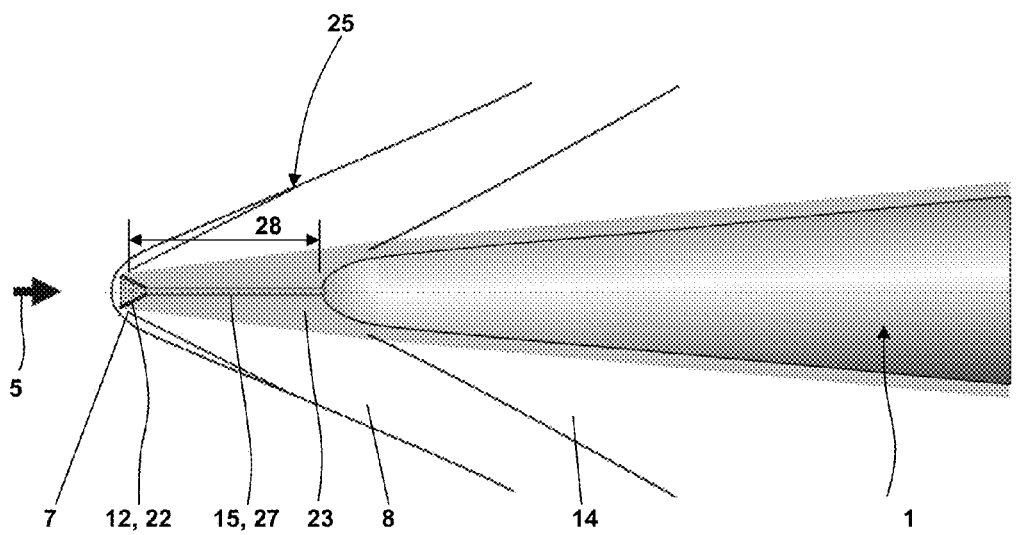

FIG. 10 shows a use of a device 25 built with the holding element 15 and the aero-cone 22 for reducing the thermal stresses of a slender main body 1 in a hypersonic airstream.

For one embodiment, the streaming element 12 decelerates at least a part of the airstream of 20% of the cross-section of the airstream passing through the region 7 prior to the shock wave 8 by at least one shock wave 14.

Many variations and modifications may be made to the preferred embodiments of the invention without departing substantially from the spirit and principles of the invention. All such modifications and variations are intended to be included herein within the scope of the present invention, as defined by the following claims.

I claim:

1. Flying object for moving with transonic or supersonic velocities relative to an airstream comprising a main body, a streaming element and a holding element,
    said holding element holding said streaming element distant from said main body,
    said streaming element being permeable for the airstream,
    said streaming element having an outer surface with a shape of a cone or a truncated cone and
    said holding element holding said streaming element in an orientation such that a base diameter of the cone or the truncated cone of the outer surface of said streaming element is at a leading end of said streaming element protruding into the airstream.

2. Flying object of claim 1, wherein
    said streaming element has a constant wall thickness,
    said streaming element has an inner surface with the shape of a cone or a truncated cone, a center axis of said cone or truncated cone being coaxial to a center axis of said cone or truncated cone building said outer surface.

3. Flying object of claim 1, wherein said streaming element is built with one material of the group of materials built by a mesh-like material, a textural material, a sieve-like material and a filter material.

4. Flying object of claim 2, wherein said streaming element is built with one material of the group of materials built by a mesh-like material, a textural material, a sieve-like material and a filter material.

5. Flying object of claim 1, wherein the streaming element is built with a sintered material.

6. Flying object of claim 2, wherein the streaming element is built with a sintered material.

7. Flying object of claim 1, wherein said streaming element is built with a ceramic material.

8. Flying object of claim 2, wherein said streaming element is built with a ceramic material.

9. Flying object of claim 1, wherein said outer surface has a straight contour in a longitudinal semi-section.

10. Flying object of claim 1, wherein said outer surface has a curved contour in a longitudinal semi-section.

11. Flying object of claim 1, wherein said holding element is designed and configured as an aero-spike.

12. Flying object of claim 1, wherein said holding element comprises at least one degree of freedom with respect to said main body, said degree of freedom being designed and arranged for allowing to change at least one element of the group built with a distance, a position and an orientation of said streaming element with respect to said main body.

13. Flying object of claim 12 comprising a passive element for passively influencing an orientation of said streaming element with respect to the airstream or a distance of said streaming element from said main body.

14. Flying object of claim 12, comprising an active element configured for actively influencing at least one element of the group built with a distance, a position and an orientation of said streaming element with respect to said main body.

15. Flying object of claim 1, wherein said streaming element being permeable for the airstream is built with a porous material wherein pores of said porous material build flow channels extending through said streaming element.

* * * * *